Patented May 22, 1934

1,959,733

UNITED STATES PATENT OFFICE 1,959,733

DISAZO DYESTUFFS

Georg Niemann, Ludwigshafen-on-the-Rhine, Germany, assignor to General Aniline Works, Inc., New York, N. Y., a corporation of Delaware No Drawing. Application July 5, 1933, Serial No. 679,146. In Germany July 21, 1932

6 Claims. (Cl. 260—77)

The present invention relates to new disazo dyestuffs and a process of producing same.

I have found that valuable disazo dyestuffs insoluble in water are obtained by coupling 1 molecular proportion of a tetrazotized aromatic diamine with 2 molecular proportions of a 3-alkyl-5-pyrazolone which is not substituted in the 1-position, the components used being free from free sulphonic and carboxylic acid groups. Suitable aromatic diamines of the kind in question are for example benzidine, ortho-tolidine, 2.2'- and 3.3'-dichlorbenzidine, dianisidine and other diaminodiphenyl compounds in which the amino groups may be in the ortho or meta position to the diphenyl linkages, phenylene diamine, para-para'-diaminobenzophenone, para-para'-diaminodiphenyl ether, para-para'-diaminodiphenylmethane, para-para'-diaminodiphenylsulphone, para-para'-diaminodiphenylamine, 1.5-diaminonaphthalene, diaminoanthracene, diaminoanthraquinone, thioaniline and their derivatives. The disazo dyestuffs may be prepared with more than one coupling component. In this case at least 1 molecular proportion of a 3-alkyl-5-pyrazolone as defined above must be used as one coupling component; the second coupling component may also be a 3-alkyl-5-pyrazolone as defined above or another compound capable of coupling, as for example an aceto-acetic acid arylide or 1-phenyl-3-methyl-5-pyrazolone or a 1-phenyl-3-carboxyalkyl-5-pyrazolone.

When preparing dyestuffs which are derived from phenylene diamines, for example from paraphenylene diamine, it is generally speaking advantageous to employ a mono-acylated phenylene diamine, for example 1-amino-4-monoacetylaminobenzene or a nitraniline, for example paranitraniline or 1-methyl-3-amino-4-methoxy-6-nitrobenzene, which nitro compounds are coupled with the equimolecular amount of a 3-alkyl-5-pyrazolone, as defined above, the resulting monoazo dyestuff being saponified or reduced under mild conditions. The resulting monoaminoazo dyestuff is then diazotized and coupled with the equimolecular amount of a 3-alkyl-5-pyrazolone or the like or another compound capable of being coupled and free from sulphonic or carboxylic groups. Dyestuffs stable against the influences of vulcanization can be obtained according to the present invention. The resulting dyestuffs are insoluble or difficultly soluble in water and usually also in organic solvents, such as alcohol, acetone or benzene. The dyestuffs may be employed for coloring plastic masses, in particular rubber and plastic masses capable of being hardened, such as phenol-aldehyde and urea-formaldehyde condensation products, can be colored in a very advantageous manner.

The dyestuffs are suitable for coloring plastic masses usually greenish-yellow to bluish-red shades. Furthermore they are practically insoluble in hydrocarbons and stable under vulcanization conditions and therefore they can be used with good effect for coloring rubber and substances containing the same.

The following examples will further illustrate the nature of this invention but the invention is not restricted to these examples. The parts are by weight.

Example 1

25.8 parts of ortho-dianisidine are dissolved in 1000 parts of water and 50 parts of concentrated hydrochloric acid, cooled to from 2° to 3° C. with 300 parts of ice and tetrazotized with an aqueous solution of 14 parts of sodium nitrite. The resulting solution of the tetrazo compound is allowed to run into a suspension of 22 parts of 3-methyl-5-pyrazolone in 2000 parts of water containing 60 parts of sodium bicarbonate.

When the coupling is completed the whole is boiled for about 2 hours and the dyestuff is then filtered off by suction and dried. The dyestuff obtained is a bluish-red powder which is insoluble in water and organic solvents.

The dyestuff described in the first paragraph of the present example may be used for varying purposes as is shown in the following paragraphs.

A mixture of rubber and additions suitable for the preparation of soft rubber or hard rubber and capable of being vulcanized, such as sulphur, zinc white, chalk and kaolin is mixed on the rollers with 1 per cent of the said dyestuff. After vulcanization, a bluish-red colored vulcanization product is obtained.

A mixture of 200 parts of casein, 8 parts of zinc white and 1 part of the said dyestuff derived from 1 molecular proportion of tetrazotized orthodianisidine and 2 molecular proportions of 3-methyl-5-pyrazolone is intimately ground, allowed to swell and hardened in the usual manner with formaldehyde. A brilliant-red colored product is obtained.

133 parts of celluloid moistened with spirit (corresponding to 100 parts of dry content) and 0.2 part of the aforesaid dyestuff are intimately mixed and then worked up in the usual manner. A very strong, covering coloring is obtained. By employing only 0.03 part of the dyestuff, a transparent coloring is obtained.

A mixture of a plastic, still unhardened phenol-formaldehyde condensation product, wood meal and titanium white is intimately mixed with 1 per cent (with reference to the total mixture) of the said disazo dyestuff. The mixture is hardened by heating to 150° C. A uniformly red colored product is obtained.

Example 2

7 parts of para-nitraniline are dissolved hot in 13 parts of a hot mixture of concentrated hydrochloric acid and 200 parts of water, poured onto ice and diazotized with 3.5 parts of sodium nitrite at from about 0° to 5° C.

The diazo solution is allowed to flow into a solution of 6 parts of 3-methyl-5-pyrazolone and 16 parts of sodium bicarbonate in 500 parts of water. When the coupling is completed, the resulting dyestuff is filtered off by suction, made into a paste with about 800 parts of water and reduced at 50° C. by means of 7.2 parts of sodium sulphide. In this way dissolution takes place. By adding 25 parts of concentrated hydrochloric acid, the hydrochloric acid salt of the reduced dyestuff is precipitated. It is filtered off by suction and diazotized by the addition of 15 parts of concentrated hydrochloric acid and 3.5 parts of sodium nitrite and then coupled with 6 parts of 3-methyl-5-pyrazolone in the manner already described.

The dyestuff obtained is distinguished by an intense red shade.

Example 3

25.4 parts of meta-dichlorbenzidine are tetrazotized and the solution obtained is allowed to flow into an alkaline solution of 22 parts of 3-methyl-5-pyrazolone containing an excess of sodium bicarbonate. As soon as coupling is completed the mixture is boiled up for a short time and the precipitate is filtered off by suction and washed. The yellow dyestuff obtained possesses an excellent fastness to light and is difficultly soluble in hydrocarbons and in oils.

If instead of meta-dichlorbenzidine the equivalent amount of 4.4'-diaminodiphenylcyclohexane serves as starting material for preparing the tetrazo compound, otherwise the same conditions being used as set forth in the preceding paragraph, a bright yellow dyestuff is obtained. The use of the equivalent proportion of thioaniline leads to a bright orange dyestuff having otherwise similar properties.

What I claim is:—

1. The process of producing disazo dyestuffs insoluble in water, which comprises coupling 1 molecular proportion of a tetrazotized diamine with 2 molecular proportions of a 3-alkyl-5-pyrazolone which is not substituted in the 1-position, the components used being free from free sulphonic and carboxylic acid groups.

2. Water-insoluble disazo dyestuffs free from free sulphonic and carboxylic acid groups corresponding to the formula

X—N=N—Y—N=N—X, wherein X stands for a 3-alkyl-5-pyrazolone having a free 1-position and Y for the radicle of an aromatic diamine.

3. Water-insoluble disazo dyestuffs free from free sulphonic and carboxylic acid groups corresponding to the formula

X—N=N—Y—N=N—X, wherein X stands for a 3 methyl-5-pyrazolone having a free 1-position and Y for the radicle of an aromatic diamine.

4. The disazo dyestuff corresponding to the formula

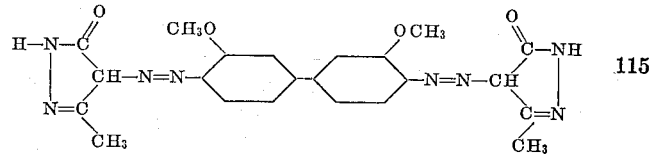

5. The disazo dyestuff corresponding to the formula

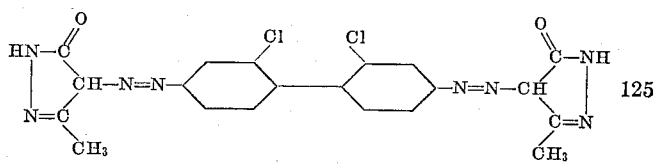

6. The disazo dyestuff corresponding to the formula

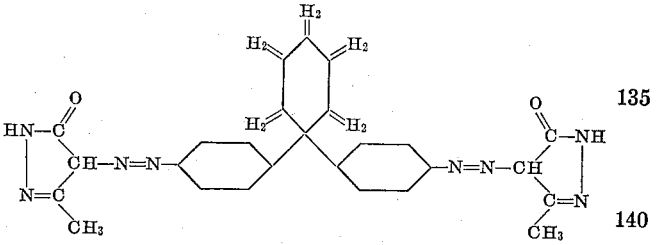

GEORG NIEMANN.